US011898697B1

(12) United States Patent
Park

(10) Patent No.: US 11,898,697 B1
(45) Date of Patent: Feb. 13, 2024

(54) OIL GUN FOR AUTOMATIC FLUID PUMP

(71) Applicant: Dukshin Corp., Ltd., Incheon (KR)

(72) Inventor: Chanil Park, Gwangmyeong-si (KR)

(73) Assignee: DUKSHIN CORP., LTD., Incheon (KR)

( * ) Notice: Subject to any disclaimer, the term of this patent is extended or adjusted under 35 U.S.C. 154(b) by 0 days.

(21) Appl. No.: 18/216,557

(22) Filed: Jun. 29, 2023

(30) Foreign Application Priority Data

Jan. 6, 2023 (KR) .................. 10-2023-0002373

(51) Int. Cl.
F16N 37/00 (2006.01)

(52) U.S. Cl.
CPC ........ *F16N 37/00* (2013.01); *F16N 2037/006* (2013.01)

(58) Field of Classification Search
CPC .... B67D 2007/0419; B67D 2007/0444; B67D 7/0205; F16N 13/00
See application file for complete search history.

(56) References Cited

U.S. PATENT DOCUMENTS

| | | | |
|---|---|---|---|
| D280,992 S * | 10/1985 | Maruyama | D15/7 |
| 5,363,889 A * | 11/1994 | Simpson | B67D 7/425 141/206 |
| 6,837,262 B2 * | 1/2005 | Cortez | B60K 15/04 137/15.16 |
| 7,121,433 B2 * | 10/2006 | Nelson | F04D 13/024 417/420 |
| 7,258,130 B2 * | 8/2007 | Cortez | G01F 23/0053 137/393 |
| 7,340,783 B2 * | 3/2008 | Leaphart, Jr. | E03C 1/308 4/255.02 |
| 7,793,801 B2 * | 9/2010 | Drummond | B67D 7/72 222/401 |
| 8,752,597 B2 * | 6/2014 | Tumarkin | B67D 7/54 29/469 |
| 8,925,595 B2 * | 1/2015 | Bonner | B65B 3/30 141/59 |
| 9,737,917 B2 * | 8/2017 | Booth | B08B 9/0433 |
| 11,326,614 B2 * | 5/2022 | Park | F04D 29/086 |

(Continued)

FOREIGN PATENT DOCUMENTS

| | | |
|---|---|---|
| JP | 4292420 B2 | 7/2009 |
| KR | 970042256 A | 7/1997 |
| KR | 101127677 B1 | 3/2012 |

(Continued)

*Primary Examiner* — Timothy L Maust
(74) *Attorney, Agent, or Firm* — KIRTON McCONKIE; Evan R. Witt

(57) ABSTRACT

An oil gun for an automatic fluid pump conveniently supplies fluid stored inside a tank to the inside of a container. The oil gun includes a case and a handle part, which has a switch to control a battery-operated suction pumping part coupled to a suction hose to which a supply hose is coupled. A gun nozzle coupling part curvedly extends downward from the handle part. The case is divided into an upper case and a lower case that can be assembled and disassembled. A first seating groove is formed on one end of each of the upper case and the lower case to receive a connector of a flow path member. A second seating groove is formed on the other end of each of the upper case and the lower case to receive an upper portion of the gun nozzle.

8 Claims, 8 Drawing Sheets

(56) References Cited

U.S. PATENT DOCUMENTS

D967,198 S    * 10/2022  Chen ................................ D15/7
2011/0220244 A1 * 9/2011  Varini ...................... B67D 7/48
                                                                141/392

FOREIGN PATENT DOCUMENTS

KR          102095211 B1   3/2020
KR          102276547 B1   7/2021
KR          102533031 B1   5/2023

* cited by examiner

OIL GUN FOR AUTOMATIC FLUID PUMP

BACKGROUND OF THE INVENTION

Technical Field

The present disclosure relates to an oil gun for an automatic fluid pump and, more specifically, to an oil gun for an automatic fluid pump, capable of conveniently supplying fluid stored in a large tank to the inside of a barrel or container of a user.

Background

In general, an automatic fluid pump indicates a device that can supply fluid inside a large tank to the inside of a barrel or container of a user by using suction force generated by the rotation of a suction fan driven by a motor.

This automatic fluid pump includes, as shown in FIG. 1, a suction pumping part 10, which operates by receiving power from a battery B according to an operating state of a switch, a suction hose 20 to which the suction pumping part 10 is coupled to a lower portion, a body part 30 having an inlet 33 formed at one side portion so that an upper end portion of the suction hose 20 is coupled thereto, an outlet 32 formed at the other side portion so as to communicate with the inlet 33 so that fluid introduced through the inlet 33 is discharged to the outside, and an accommodation part 31 formed at an upper portion so as to accommodate the battery B, and a supply hose 40 of which one side end portion is fixedly coupled to the outlet 32 formed at the other side of the body part 30.

In this automatic fluid pump, in order to supply fluid such as gasoline or diesel stored inside the tank 50 to the inside a container 60 of various equipment, if an operator inserts the suction hose 20, of which the upper end is coupled to the inlet 33 of the body part 30, into the tank 50, and places the other side portion of the supply hose 40, of which the one side end portion is fixedly coupled to the outlet 32 of the body part 30, in the inlet of the container 60, and then manipulates the switch so that the suction pumping part 10 operates by receiving power from the battery B, the fluid stored in the tank 50 flows into the inlet 33 of the body part 30 through the suction hose 20 by the suction force of the suction pumping part 10 and is discharged to the outside of the body part 30, and the fluid discharged to the outside of the body part 30 is supplied to the inside of the container 60 through the supply hose 40, of which the one side end portion fixedly coupled to the outlet 32 and the other side portion is inserted into the container 60.

However, in the prior art, when supplying fluid to the container 60, the amount of fluid replenished in the container 60 cannot be checked, so there is a problem in that the fluid must be supplied by measuring a supply amount only through the operator's senses or with the eye.

Therefore, in order to solve the above problem in the prior art, as shown in FIG. 2, a gun nozzle 80 with a built-in infrared sensor 70 is coupled to the other side of the supply hose 40, so that when an amount of fluid supplied to the container 60 detected by the infrared sensor 70 installed in the gun nozzle 80 reaches an appropriate value, the operation of the suction pumping part 10 is stopped so that an appropriate amount of fluid is supplied to the container 60.

However, there are still problems with the prior art. Since a distance between the container 60 and the tank 50 is long, while an operator moves to operate the switch installed on the body part 30 in a state where the gun nozzle 80 is placed in the inlet of the container 60, the gun nozzle 80 may be separated from the inlet of the container 60 and then it becomes impossible to supply the fluid stored in the tank 50 to the inside of the container 60.

In addition, in the above case, there is a problem such as residual oil remaining in the supply hose 40 even after supplying the fluid to the container 60.

PRIOR ART DOCUMENT

Patent Document

[Patent Document 1] Korean Reg. Patent Publication No. 10-2095211 (published: Mar. 25, 2020)

SUMMARY OF THE INVENTION

Problems to be Solved

The present disclosure was derived to solve the above conventional problems, and it is an object of the present disclosure to provide an oil gun for an automatic fluid pump, in which a gun nozzle with a built-in infrared sensor is coupled to a lower portion of a handle of an oil gun where a switch is installed so as to supply or cut off power of a battery to a suction pumping part according to a manipulation state, and an upper portion of a supply hose is coupled to an upper portion of the oil gun, so that if the switch is manipulated while the gun nozzle is inserted into the inlet of a container while the oil gun is held by hand, fluid stored inside a tank is introduced into the inlet of a body part through a suction hose by suction force of the suction pumping part and then discharged to the outside of the body part through an outlet, wherein the fluid discharged to the outside of the body part passes through a supply hose of which an upper portion is fixedly coupled to the outlet so that the fluid is supplied to the inside of the container through the oil gun.

Another object of the present disclosure is to provide an oil gun for an automatic fluid pump, which can prevent residual oil from remaining in a supply hose by the oil gun even after supplying fluid stored in a tank to a container.

Technical Solutions

In order to achieve the above objects, according to one aspect of the present disclosure, there is provided an oil gun for an automatic fluid pump, characterized in that a case includes a handle part, which has a switch installed on an outer portion so that a suction pumping part coupled to a lower portion of a suction hose can operate with power supplied from a battery, and of which one side end portion is coupled to an end portion of a supply hose so that the supply hose is fixed, and a gun nozzle coupling part extending downward from the handle part so as to be curved, wherein the case is divided into an upper case and a lower case that can be assembled and disassembled, a first seating groove is formed on one end of each of the upper case and the lower case so that one side portion of a connector of a flow path member is inserted and seated in the first seating grooves, and a second seating groove is formed on the other end of each of the upper case and the lower case so that one side.

According to another aspect of the present disclosure, there is provided an oil gun for an automatic fluid pump, which includes a case including a handle part, which has a switch installed on an outer portion so that a suction pumping part coupled to a lower portion of a suction hose can operate with power supplied from a battery, and of which one side end portion is coupled to one end portion of a supply hose so that the supply hose is fixed, and a gun nozzle coupling part extending downward from the handle part so as to be bent, and a flow path member installed so that a flow path is formed inside the case having the handle part and the gun nozzle coupling part, wherein the flow path member includes a connector installed and fixed to one side end portion of the handle part, a connecting hose of which one end is fitted to the connector, and a joint member formed to be bent so that one end of the joint member is fitted to the other end of the connecting hose and one side portion of a gun nozzle is fitted to the other end of the joint member.

Meanwhile, the connecting hose is formed in a bellows type. Therefore, even if an assembly error occurs between a joint member and a connector when assembling an upper case and a lower case so that a flow path is formed inside the case, length of the connecting hose is changed, thereby enabling one side and the other side end portions of the connecting hose to be conveniently inserted into the joint member and the connector, respectively.

In addition, a fastening part having a thread is formed on an outer surface of the one side end portion of the handle part to which the connector is fixed, and a coupling joint is fastened to the fastening part so that an outer surface of the one end portion of the supply hose is compressed and fixed.

Meanwhile, the joint member is inclined so that a flow path of a bent part is placed higher than a flow path of a part where an upper portion of the gun nozzle is fitted. Therefore, after fluid stored in a tank is supplied to a container, oil remaining in the supply hose does not leak through the oil gun.

In addition, a plurality of locking grooves are formed at regular intervals on an outer portion of the gun nozzle so as to be caught in an inlet of the container, thereby preventing the gun nozzle from being inserted into the inlet more than a certain amount and preventing the gun nozzle from being arbitrarily withdrawn from the inlet. Therefore, it would be more preferable to allow an operator to control an insertion amount of the gun nozzle into the container through the locking grooves and at the same time to prevent the gun nozzle from being arbitrarily drawn out and separated from the inlet of the container.

Meanwhile, a locking member having a locking jaw may be coupled to an outer portion of a lower portion of the gun nozzle coupling part, so that when the gun nozzle is inserted into the inlet of the container, the locking member can be caught in the inlet of the container and maintain an inserted state of the gun nozzle.

In addition, a stem holder may be installed on the outer portion of the gun nozzle so as to be detachably attached to the container, so that the stem holder can prevent the gun nozzle from being separated from the container.

Meanwhile, a sensor for detecting an amount of fluid supplied to the inside of the container is installed on the other side portion of the gun nozzle, of which the one side portion is fitted to the joint member. Therefore, according to a detection signal of the sensor, a control unit cuts off power of the battery supplied to the suction pumping part.

In addition, the case in which the flow path member is installed so that the flow path is formed inside the handle part and the gun nozzle coupling part may be divided into an upper case and a lower case that can be assembled and disassembled, and a first seating groove and a second seating groove are respectively formed on one end and the other end of each of the upper case and the lower case, so that one side portion of the connector is inserted and seated in the first seating groove so as to be fixed and the other side portion of the joint member where the upper portion of the gun nozzle is fitted is seated in the second seating groove, wherein assembly can be performed so that the flow path is formed inside the case by assembling the upper case and the lower case in such a manner that the one side portion of the connecting member and the other side portion of the connecting member are respectively inserted and seated in the first seating groove and the second seating groove.

Meanwhile, it is more preferable that a storage hole in which the gun nozzle is inserted and stored is formed in a lower portion of a body part, where the suction hose and the supply hose are coupled so as to communicate with each other, so that the gun nozzle can be prevented from being contaminated due to contact with an external object.

Advantageous Effects

According to the present disclosure, in order to supply fluid stored inside a tank to the inside of a container of a user, if an operator manipulates the switch after inserting the gun nozzle into the inlet of the container while holding the handle part of the oil gun by hand, the fluid stored inside the tank is introduced into the inlet of the body part through the suction hose by the suction force of the suction pumping part and is discharged to the outside of the body part through the outlet, and the fluid discharged to the outside of the body part is supplied to the inside of the container through the oil gun through the supply hose, of which the upper portion is fixedly coupled to the outlet. Therefore, it is convenient to supply the fluid stored in the tank to the container.

In addition, according to the present disclosure, even when the fluid stored in the tank is supplied to the container of a user, the gun nozzle is prevented from being arbitrarily withdrawn from the inlet of the container, so that the fluid stored in the tank can be safely supplied to the inside of the container.

DESCRIPTION OF THE INVENTION

Hereinafter, the technical features of the present disclosure will be described in detail with reference to the accompanying drawings.

Figure 1:
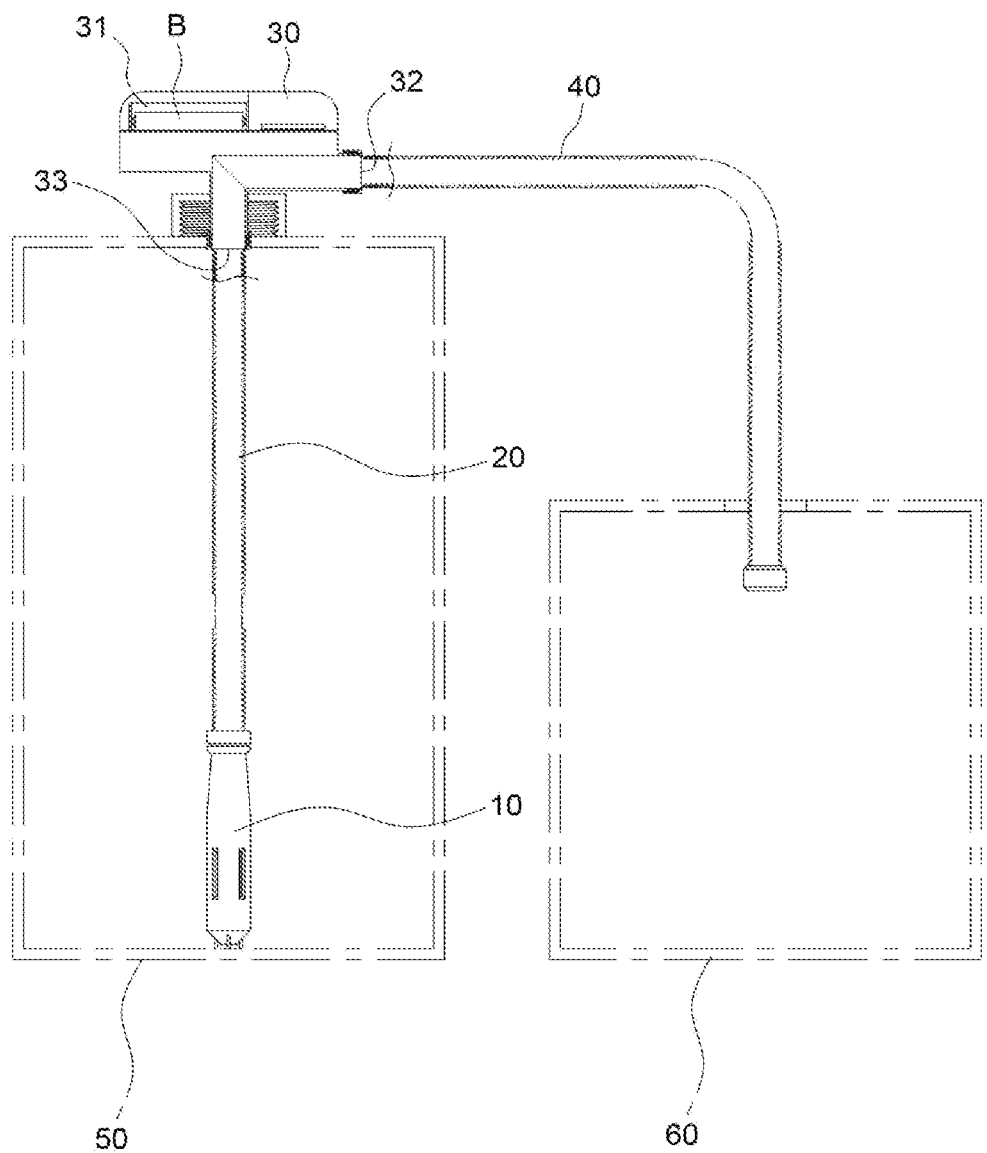
FIG. 1 is a schematic cross-sectional view showing the configuration of a general automatic fluid pump.
Figure 2:
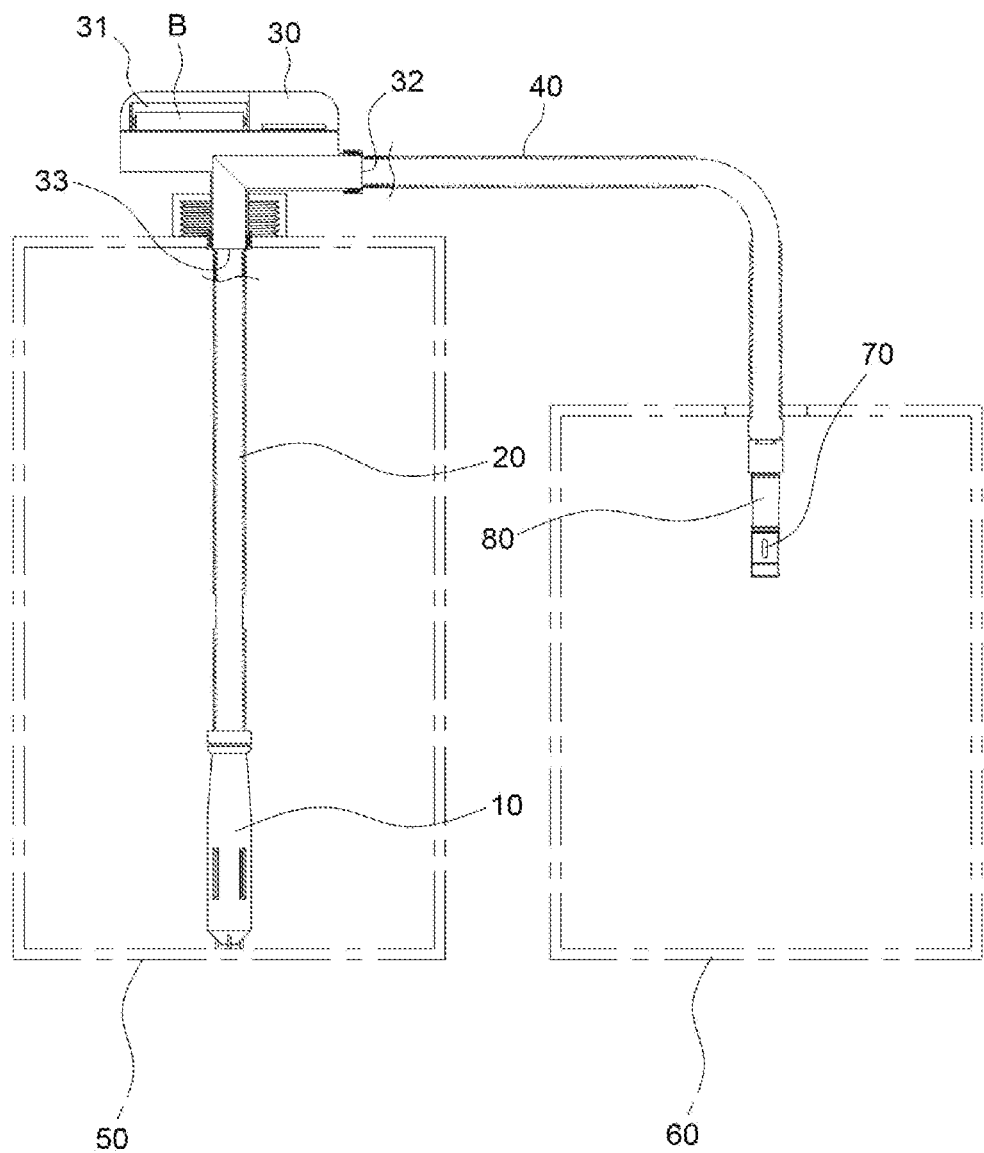
FIG. 2 is a schematic cross-sectional view showing an embodiment of a general automatic fluid pump.
Figure 3:
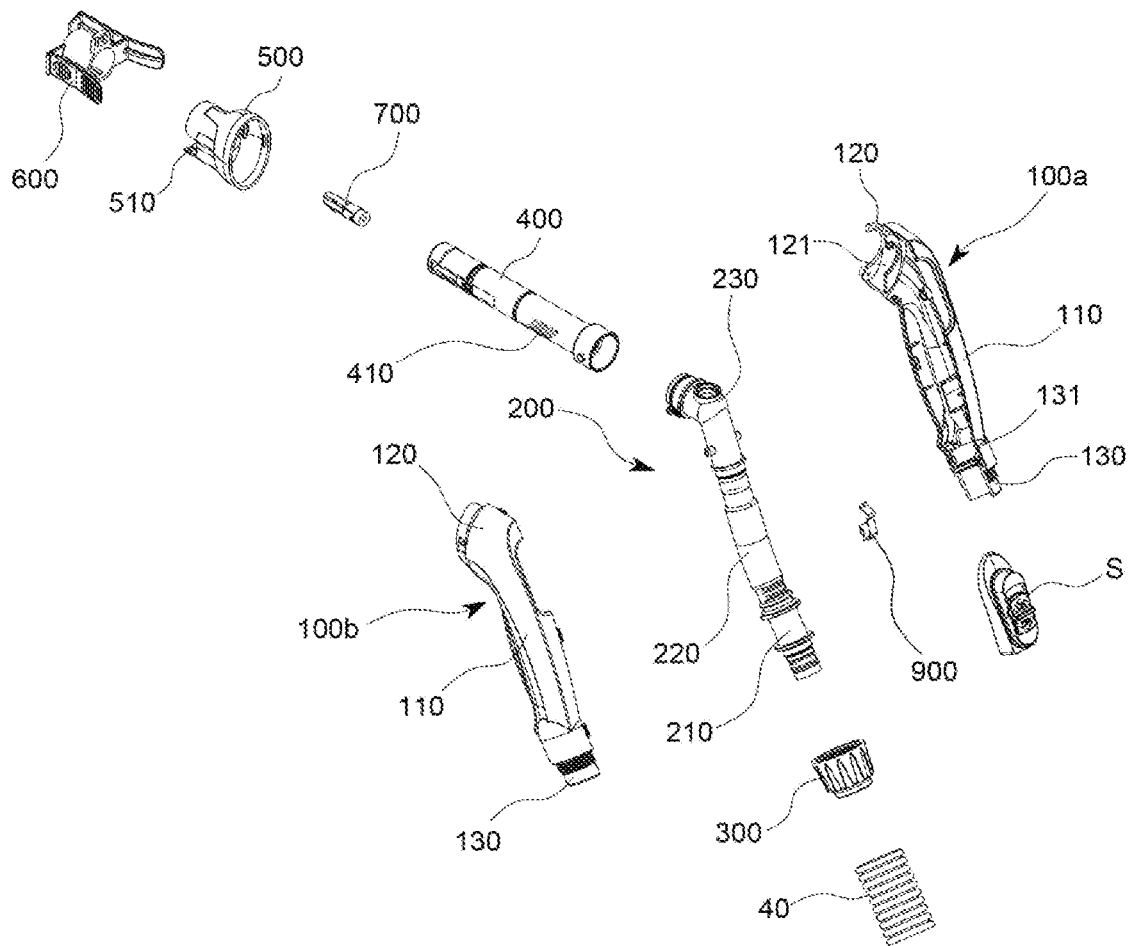
FIG. 3 is an exploded perspective view showing the configuration of an oil gun for an automatic fluid pump according to the present disclosure.
Figure 4:
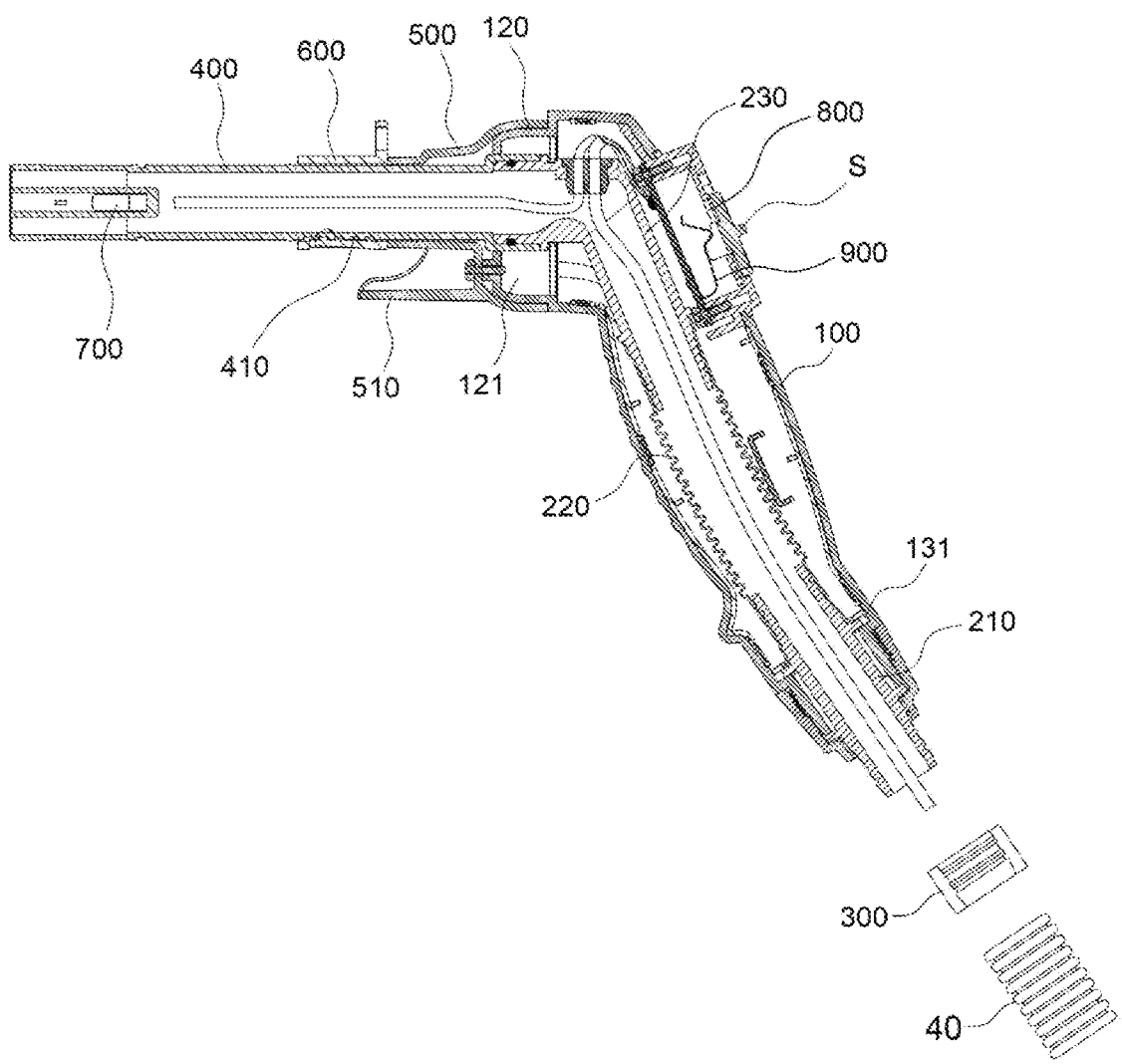
FIG. 4 is a cross-sectional view showing the configuration of the oil gun for an automatic fluid pump according to the present disclosure.
Figure 5:
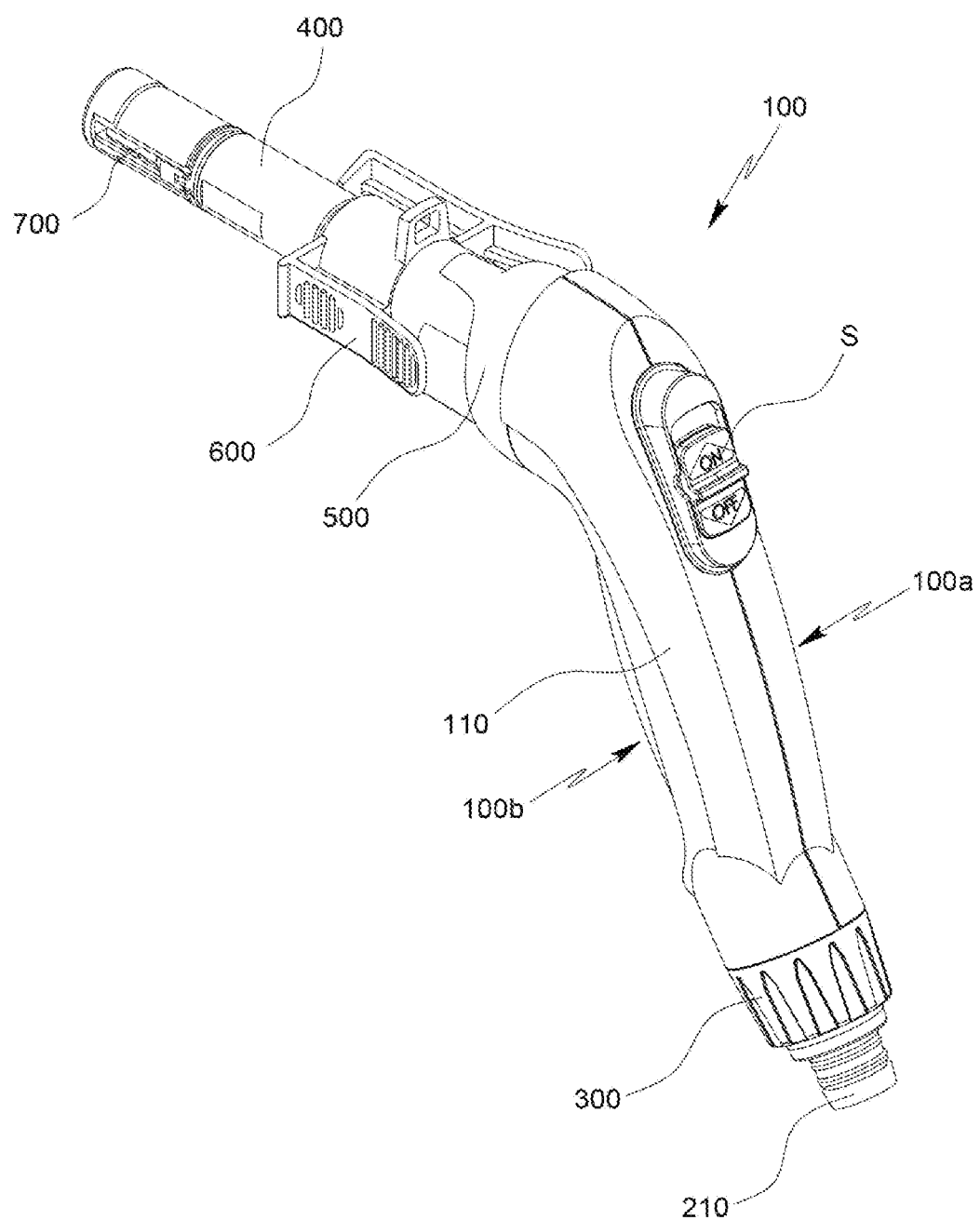
FIG. 5 is a perspective view showing an oil gun for an automatic fluid pump according to the present disclosure.
Figure 6:
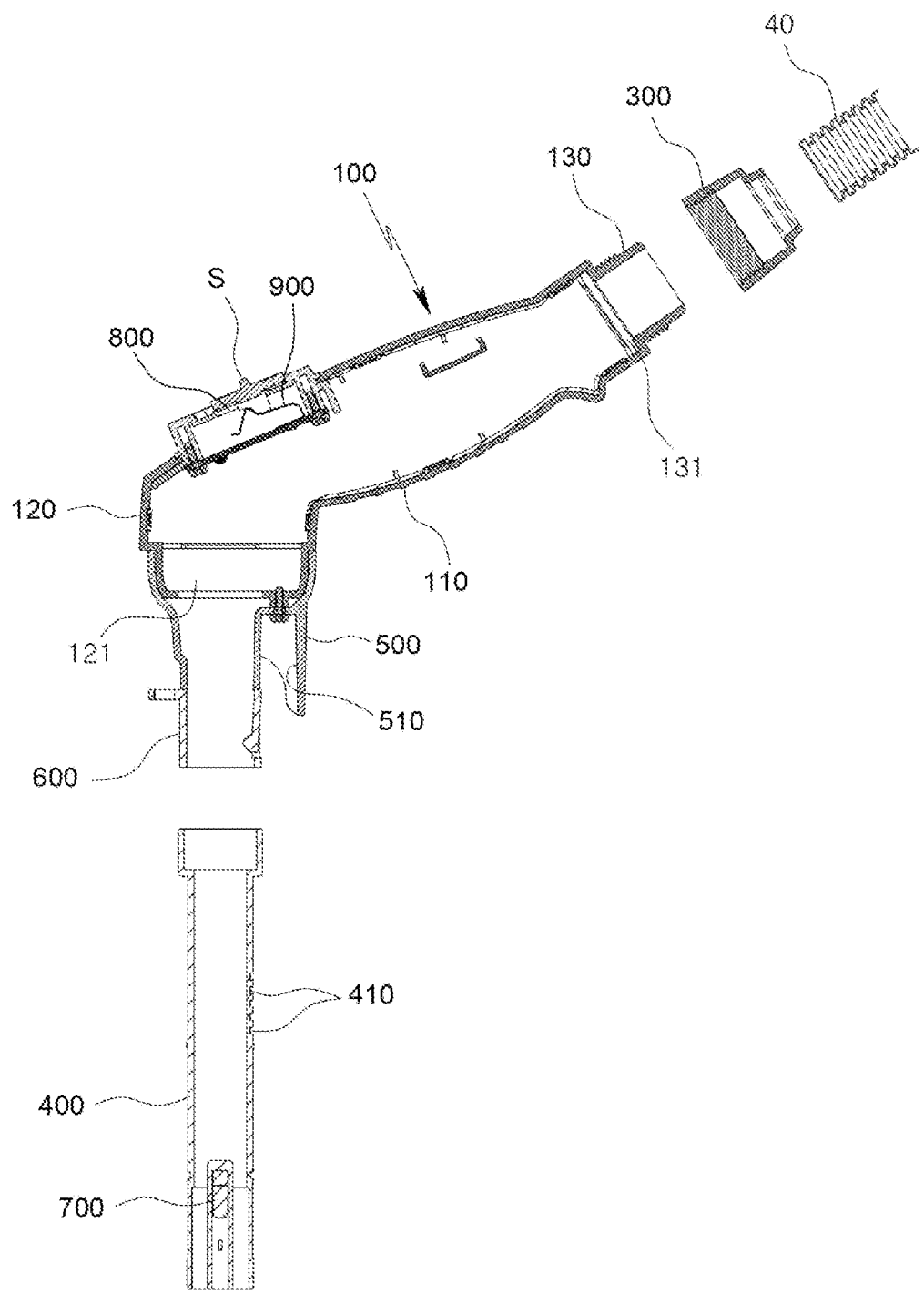
FIG. 6 is a cross-sectional view showing the oil gun for an automatic fluid pump according to the present disclosure.
Figure 7:
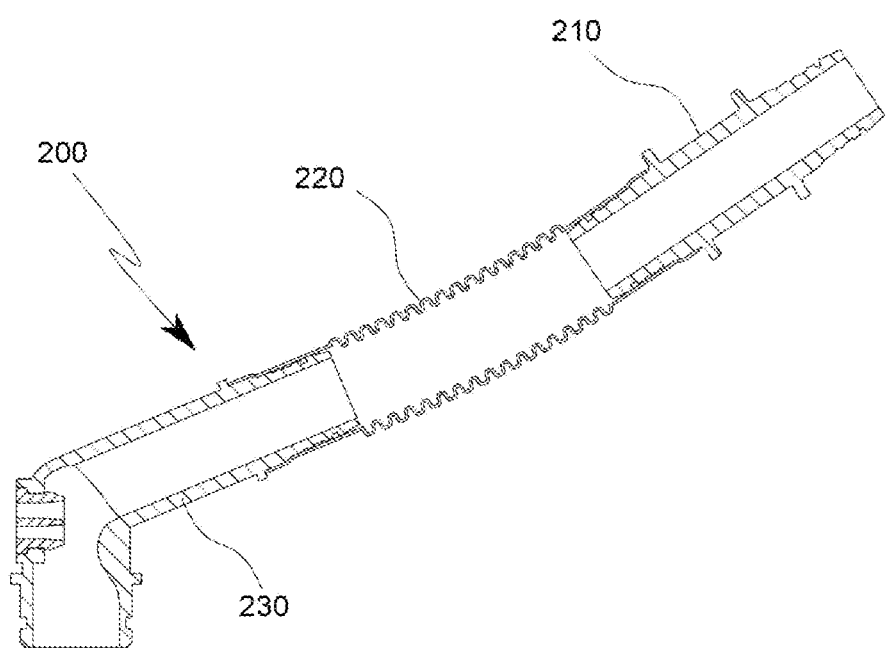
FIG. 7 is a cross-sectional view showing a flow path member for an automatic fluid pump according to the present disclosure.
Figure 8:
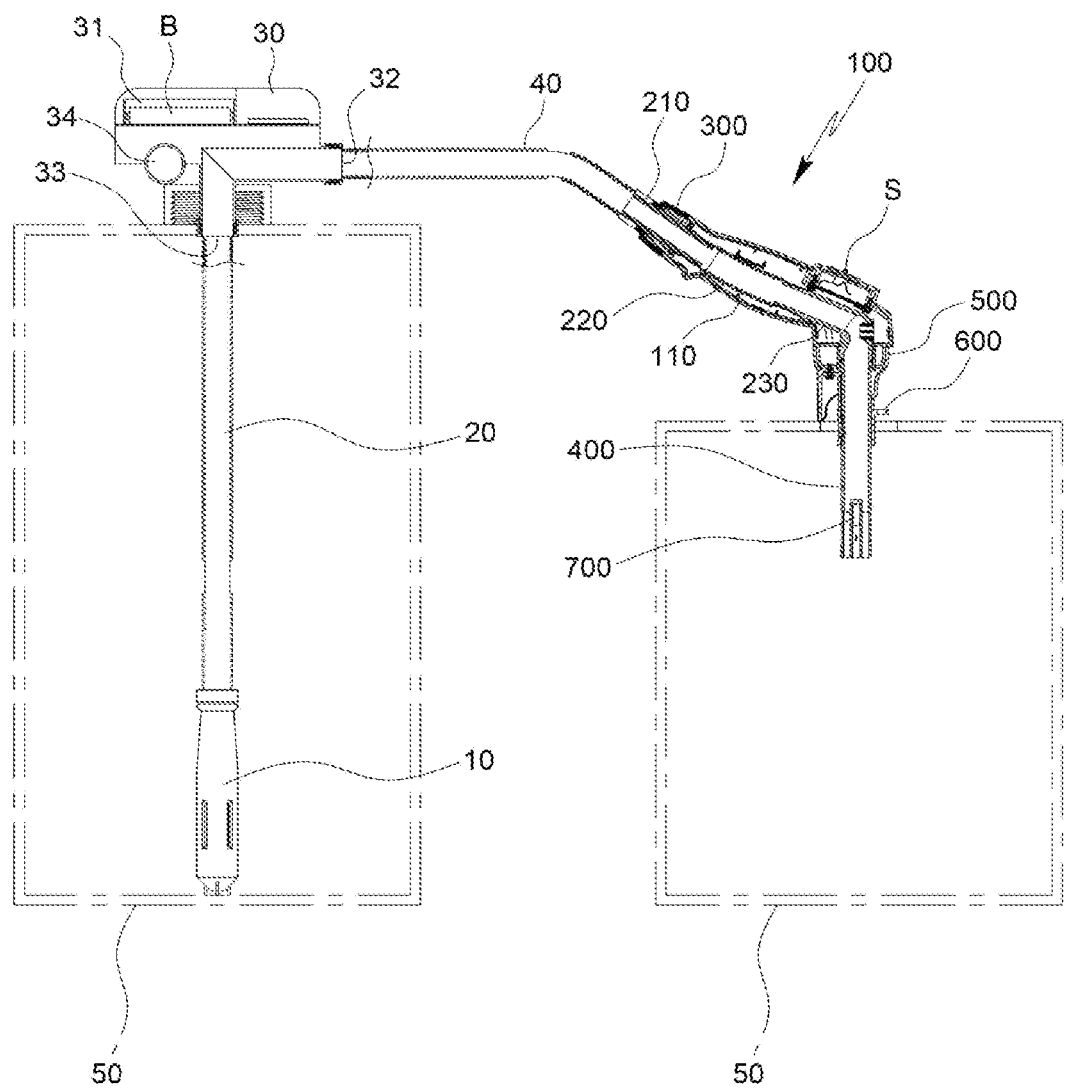
FIG. 8 is a view showing a state of use, in which the oil gun according to the present disclosure is coupled to a supply hose of an automatic fluid pump.

FIG. 1 is a schematic cross-sectional view showing the configuration of a general automatic fluid pump, FIG. 2 is a schematic cross-sectional view showing an embodiment of a general automatic fluid pump, FIG. 3 is an exploded perspective view showing the configuration of an oil gun for an automatic fluid pump according to the present disclosure, FIG. 4 is a cross-sectional view showing the configuration of the oil gun for an automatic fluid pump according to the present disclosure, FIG. 5 is a perspective view showing an oil gun for an automatic fluid pump according to the present disclosure, FIG. 6 is a cross-sectional view showing the oil gun for an automatic fluid pump according to the present disclosure, FIG. 7 is a cross-sectional view showing a flow path member for an automatic fluid pump according to the present disclosure, and FIG. 8 is a view showing a state of use, in which the oil gun according to the present disclosure is coupled to a supply hose of an automatic fluid pump.

According to the present disclosure, an oil gun for an automatic fluid pump includes, as shown in FIG. 1 to FIG. 8, a case 100 including a handle part 110, which has a switch S installed on an outer portion so that a suction pumping part coupled to a lower portion of a suction hose 20 can operate with power supplied from a battery B, and of which one side end portion is coupled to one end portion of a supply hose 40 so that the supply hose 40 is fixed, and a gun nozzle coupling part 120 extending downward from the other side end portion of the handle part 110 so as to be bent, and a flow path member 200 installed so that a flow path is formed inside the handle part 110 and the gun nozzle coupling part 120 of the case 100, wherein the flow path member 200 includes a connector 210 installed and fixed to one side end portion of the handle part 110, a connecting hose 220 of which one end is fitted and fixed to the connector 210, and a joint member 230 formed to be bent so that one end of the joint member 230 is fitted to the other end of the connecting hose 220 and one side portion of a gun nozzle 400 is fitted to the other end of the joint member 230.

In the drawings, reference numeral 900 indicates a spring that returns the switch S to its original position by elastic force after the switch S is operated so that power of the battery B is supplied to the suction pumping unit 10.

Meanwhile, the connecting hose 220 is formed in a bellows type.

In addition, a fastening part 130 having a thread is formed on an outer surface of the one side end portion of the handle part 110 to which the connector 210 is fixed, and a coupling joint 300 is fastened to the fastening part 130 so that an outer surface of the one end portion of the supply hose 40 is compressed and fixed.

Meanwhile, the joint member 230 is inclined so that a flow path of a bent part is placed higher than a flow path of a part where the upper portion of the gun nozzle 400 is fitted.

In addition, a plurality of locking grooves 410 are formed at regular intervals on an outer portion of the gun nozzle 400 so as to be caught in an inlet of a container 60, thereby preventing the gun nozzle 400 from being inserted more than a certain amount and preventing the gun nozzle 400 from being arbitrarily withdrawn from the inlet.

Meanwhile, a sensor 700 for detecting an amount of fluid supplied to the inside of the container 60 is installed on the other side portion of the gun nozzle 400, of which the one side portion is fitted to the joint member 230.

In addition, the case 100 in which the flow path member 200 is installed so that the flow path is formed inside the handle part 110 and the gun nozzle coupling part 120 may be divided into an upper case 100a and a lower case 100b that can be assembled and disassembled, and a first seating groove 131 and a second seating groove 121 are respectively formed on one end and the other end of each of the upper case 100a and the lower case 100b, so that one side portion of the connector 210 is inserted and seated in the first seating groove 131 so as to be fixed and the other side portion of the joint member 230 where the upper portion of the gun nozzle 400 is fitted is seated in the second seating groove 121.

Meanwhile, a storage hole 34 in which the gun nozzle 400 is inserted and stored is formed in a lower portion of a body part 30, where the suction hose 20 and the supply hose 40 are coupled so as to communicate with each other.

According to the present disclosure structured in this way, the connector 210 fitted and coupled to the connecting hose 220 is seated on the first seating groove 131 of the upper case 100a, and the joint member 230 fitted and coupled to the connecting hose 220 is inserted and seated on the second seating groove 121 of the upper case 100a, and then the lower case 100b is coupled to the upper case 100a, thereby forming the case 100 in which the flow path is formed.

Herein, since the connecting hose 220 is formed in a bellows type, the connection hose 220 is positioned inside the case 100 while varying in length depending on a distance between the connector 210 and the connection member 230.

Meanwhile, the switch S is operably installed on the outside of the case 100 formed by coupling the upper case 100a and the lower case 100b so as to allow the suction pumping part 10 coupled to the lower portion of the suction hose 20 to operate with power supplied from the battery B.

In addition, after assembling the case 100 as described above, the coupling joint 300 is fastened to the fastening part 130 formed on the outer surface of the handle part 110 so that the outer surface of the one end of the supply hose 40 is compressed and fixed, thereby firmly maintaining airtightness.

Therefore, in order to supply fluid stored inside the tank 50 to the inside of the container 60 of a user, an operator inserts the suction hose 20, of which the upper end is coupled to an inlet 33 of the body part 30, into the tank 50, places the other side portion of the supply hose 40, of which the one side end portion is fixedly coupled to the outlet 32 of the body part 30, in the inlet of the container 60, and then inserts the gun nozzle 400 to the inside of the container 60 through the inlet while holding the handle part 110 formed on the case 100 with a hand.

At this time, an insertion amount of the gun nozzle 400 that is inserted into the container 60 is determined according to a position where the locking grooves 410 formed on the outer portion of the gun nozzle 400 is caught on a frame of the container 60 having the inlet during insertion of the gun nozzle 400 into the container 60. Therefore, the insertion amount of the gun nozzle 400 that is inserted into the container 60 can be controlled by an operator through the locking grooves 410. In addition, the gun nozzle 400 is suppressed from being arbitrarily drawn out and dropped from the inlet of the container 60.

Of course, it is also possible to maintain a state in which the gun nozzle 400 is inserted into the container 60 by coupling a locking member 500 having a locking jaw 510 to the outer portion of the gun nozzle coupling part 120 so that the locking member 500 can be caught on a surface of the container when the gun nozzle 400 is inserted into the inlet of the container 60.

In addition, it is also possible to prevent the gun nozzle 400 from being separated from the container 60 by means of a stem holder 600 by installing the stem holder 600 to the outer portion of the gun nozzle 400, wherein the stem holder 600 is detachably attached to the container 60.

Meanwhile, it is more preferable that the stem holder 600 to be detachably attached to the container 60 is integrally formed with the locking member 500 that is coupled to the outer portion of the gun nozzle 400, so that the locking member 500 is caught on the surface of the container 60, thereby maintaining a state in which the gun nozzle 400 is inserted into the container 60 and, at the same time, the stem holder 600 prevents the gun nozzle 400 from being separated from the container 60 during use.

In the state where the gun nozzle 400 is inserted into the container 60 as described above, if an operator manipulates the switch S, the fluid stored in the tank 50 flows into the suction hose 20 by the suction force generated by the suction pumping part 10 which operates with the power from the battery B, and the fluid introduced into the suction hose 20 flows into the body part 30 through the inlet 33 and then is discharged to the outside through the outlet 32, wherein the fluid discharged to the outside of the body part 30 flows into the flow path formed inside the case 100 through the supply hose 40, of which the one side portion is fixedly coupled to the outlet 32, and the fluid introduced into the flow path is supplied to the inside of the container 60 through the gun nozzle 400.

At this time, the fluid introduced into the flow path formed inside the case 100 is supplied to the inside of the container 60 through the gun nozzle by sequentially passing through the connector 210 fixedly installed on the handle part 110, the connecting hose 220 fixedly fitted to the connector 210, and the bent joint member 230 fitted to the connecting hose 220 and the gun nozzle 400.

Meanwhile, after the fluid stored in the tank 50 is supplied to the container 60 as described above, the sensor 700 detects it and transmits a signal to the control unit 800, and the control unit 800 cuts off the power of the battery B that is supplied to the suction pumping part 10 according to the detection signal from the sensor 700 so as to block the fluid from being supplied to the inside of the container 60.

At this time, it is possible to prevent the fluid from remaining in the connecting hose 220 since the joint member 230 is formed to be inclined so that the flow path at the bent part is positioned higher than the flow path at the part where the upper portion of the gun nozzle 400 is fitted.

In addition, in order to prevent contamination of the gun nozzle 400 due to contact of the gun nozzle 400 with external objects after filling the container 60 as described above, the gun nozzle 400 is inserted into the storage hole 34 formed at the lower portion of the body part 30 for storage.

Although the preferred embodiments of the present disclosure have been described in detail above, the scope of the present disclosure is not limited thereto, and various modifications and improvements made by those skilled in the art by using the basic concept of the present disclosure defined in the following claims also fall within the scope of the present disclosure.

| Explanation of Reference Signs | |
|---|---|
| 10: | Suction pumping part |
| 20: | Suction hose |
| 40: | Supply hose |
| 100: | Case |
| 110: | Handle part |
| 120: | Gun nozzle coupling part |
| 200: | Flow path member |
| 210: | Connector |
| 220: | Connecting hose |

| Explanation of Reference Signs | |
|---|---|
| 230: | Joint member |
| 400: | Gun nozzle |

What is claimed is:

1. An oil gun for an automatic fluid pump, comprising:
   a case including
   a handle part, which has a switch installed on an outer portion so that a suction pumping part coupled to a lower portion of a suction hose can operate with power supplied from a battery, and of which one side end portion is coupled to one end portion of a supply hose so that the supply hose is fixed, and
   a gun nozzle coupling part extending downward from the handle part so as to be bent; and
   a flow path member installed so that a flow path is formed inside the handle part and the gun nozzle coupling part of the case,
   wherein the flow path member includes:
   a connector installed and fixed to one side end portion of the handle part;
   a connecting hose of which one end is fitted to the connector; and
   a joint member formed to be bent so that one end of the joint member is fitted to the other end of the connecting hose and one side portion of a gun nozzle is fitted to the other end of the joint member, and
   wherein the case in which the flow path member is installed is divided into an upper case and a lower case that can be assembled and disassembled, and a first seating groove and a second seating groove are respectively formed on one end and the other end of each of the upper case and the lower case, so that one side portion of the connector is inserted and seated in the first seating grooves and one side portion of the joint member where an upper portion of the gun nozzle is fitted is seated in the second seating grooves.

2. The oil gun for an automatic fluid pump according to claim 1, wherein the connecting hose is formed in a bellows type.

3. The oil gun for an automatic fluid pump according to claim 1, wherein a fastening part having a thread is formed on an outer surface of the one side end portion of the handle part to which the connector is fixed, and a coupling joint is fastened to the fastening part so that an outer surface of the one end portion of the supply hose is compressed and fixed.

4. The oil gun for an automatic fluid pump according to claim 1, wherein the joint member is inclined so that a flow path at a bent part is placed higher than a flow path at a part where the upper portion of the gun nozzle is fitted.

5. The oil gun for an automatic fluid pump according to claim 1, wherein a locking member having a locking jaw formed thereon is coupled to an outer portion of a lower portion of the gun nozzle coupling part.

6. The oil gun for an automatic fluid pump according to claim 1, wherein a plurality of locking grooves are formed at regular intervals on an outer portion of the gun nozzle so as to be caught in an inlet of a container, thereby preventing the gun nozzle from being inserted more than a certain amount and preventing the gun nozzle from being arbitrarily withdrawn from the inlet.

7. The oil gun for an automatic fluid pump according to claim 1, wherein a stem holder is installed on an outer portion of the gun nozzle so as to be detachably attached to the container.

8. The oil gun for an automatic fluid pump according to claim 7, wherein the stem holder detachably attached to the container is integrally formed with the locking member coupled to the outer portion of the gun nozzle.

* * * * *